Aug. 13, 1935.   J. LEFLAR   2,011,495
MEANS FOR BALANCING MOTOR ARMATURES
Filed Nov. 21, 1929
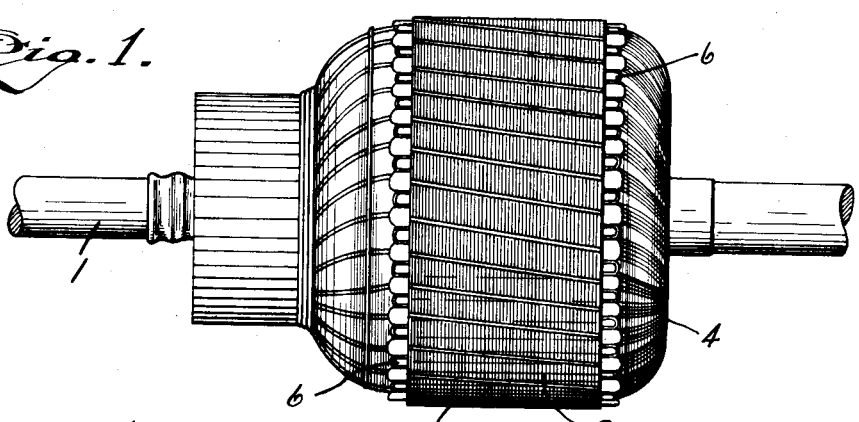
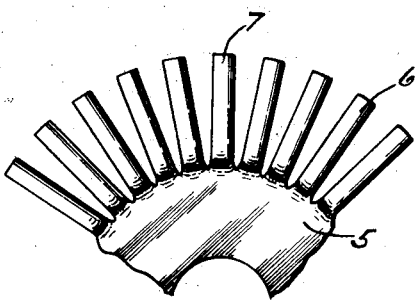
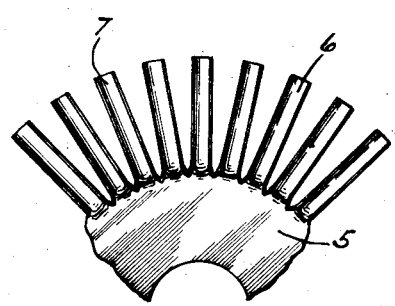

Patented Aug. 13, 1935

2,011,495

UNITED STATES PATENT OFFICE 2,011,495

MEANS FOR BALANCING MOTOR ARMATURES

Jerome Leflar, Dayton, Ohio, assignor to The Master Electric Company, Dayton, Ohio, a corporation of Ohio Application November 21, 1929, Serial No. 408,814

4 Claims. (Cl. 171—206)

My invention relates to electric motors and more particularly to the means for balancing motor armatures.

As usually constructed, a motor armature embodies a series of slotted laminæ assembled upon a shaft within the registering slots of which are engaged a plurality of overlapping coils or windings. For efficient and successful high speed operation, it is necessary that the armature be accurately balanced. This is ordinarily accomplished by driving small wedges into the slots of the laminæ at such points as may be necessary to properly distribute the mass of the armature about its axis. The insertion of such balancing wedges sometimes injures the insulation of the coil or winding wires, and such balancing weights or wedges are likely to become displaced or loosened. The purpose of the present invention is to afford convenient and efficient means for balancing such motor armatures by providing about the armature a series of radially disposed weight receiving pockets open at the periphery of the armature to receive balancing weights and adapted to be closed to retain the weights by being crimped or retracted. To this end there is provided at each end of the assembly of laminæ, terminal discs having formed integral therewith a series of radially disposed grooved fingers, the grooved faces of which are disposed contiguous to the adjacent lamina. In the completed armature these grooved fingers of the spider-like terminal members extend intermediate the armature windings with their open ends exposed and easily accessible for the insertion of lead slugs or weights.

The object of the invention is to simplify the construction of motor armatures as well as the means and mode of balancing such devices, whereby they will not only be cheapened in construction, but will be more efficient in use, capable of being accurately balanced and unlikely to get out of order.

A further object of the invention is to provide a receptacle for a balance weight to be assembled as a part of the motor armature.

A further object of the invention is to provide an improved means for balancing motor armatures whereby such armatures may be accurately and quickly balanced relative to their axis.

With the above primary and other incidental objects in view, as will more fully appear in the specification, the invention consists of the features of construction, the parts and combinations thereof, and the mode of operation or their equivalents as hereinafter described and set forth in the claims.

Referring to the accompanying drawing wherein is shown the preferred, but obviously not necessarily the only, form of embodiment of the invention, Fig. 1 is a side elevation of a motor armature in which the present invention is embodied.

Fig. 2 is an end elevation thereof.

Fig. 3 is a face view of the balancing disc or spider separated from the armature.

Fig. 4 is a detail sectional view.

Fig. 5 is a detail sectional view.

Like parts are indicated by similar characters of reference throughout the several views.

Referring to the accompanying drawing, 1 is the armature shaft and 2 the commutator. Mounted upon the shaft 1 is an assembly of slotted laminæ 3 through the registering slots of which extend a series of overlapping coils or windings 4. At the opposite ends of the assembly 3 of laminæ, are terminal discs 5 from the margins of which radially project series of grooved fingers 6 formed integral with the disc 5. These discs 5 form the terminal lamina of the series 3 and are disposed with their grooved faces contiguous to the succeeding lamina. Thus the open side of the grooved fingers are closed by the adjacent lamina, leaving the extremities of such fingers open as at 7 contiguous with the periphery of the armature. The windings 4 of the armature enclose the grooved fingers 6 which project intermediate such winding. The disc 5 with its radially disposed grooved fingers 6 thus becomes an integral part of the armature. After the completion of assembly, the armature is placed in a balancing device and rotated about its axis to discover any unbalanced or unequal distribution of weight. Such unbalanced condition is then compensated for by depositing within the open ends 7 of the grooved fingers 6, balancing weights or slugs 8. These balancing slugs may be deposited in as many of the grooved fingers 6 as may be necessary to accurately and uniformly balance the armature. The open ends of the fingers 6 containing such balance weights or slugs are then closed by clamping or contracting the ends over the weights or slugs to prevent their escape.

It is found in practice that motor armatures may be quickly and accurately balanced without danger of injury to the coils or windings and by clamping or contracting the ends of the grooved fingers 6 the weights are permanently secured against escape.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. A motor armature comprising a core including a plurality of laminæ, the terminal lamina being radially grooved in the side adjacent the succeeding lamina to form therebetween a series of radial pockets open at the periphery of the armature, and balancing weights carried within the pockets to balance the armature.

2. A motor armature comprising a core including a deflected disc mounted concentric therewith, a series of peripherally spaced radial pockets formed in the disc, and weight slugs for balancing the armature carried within said pockets and held therein by crimping the outer edges of the disc.

3. The combination with a motor armature of a spider-like member mounted thereon, including a plurality of hollow fingers extending intermediate the armature windings, and balancing weights carried within the hollows of said fingers which have the outer end crimped to hold the weights in position.

4. In an armature for a motor, a disc and a series of radially disposed grooved fingers closed at their inner ends formed integral with the disc and projecting beyond the periphery thereof, and balancing weights carried within the grooves of the fingers which have the outer ends crimped to hold the weights in position.

JEROME LEFLAR.